United States Patent
Holkkola

(10) Patent No.: US 10,129,096 B2
(45) Date of Patent: *Nov. 13, 2018

(54) COMMISSIONING/DECOMMISSIONING NETWORKS IN ORCHESTRATED OR SOFTWARE-DEFINED COMPUTING ENVIRONMENTS

(71) Applicant: FUSIONLAYER OY, Espoo (FI)

(72) Inventor: Juha Holkkola, Espoo (FI)

(73) Assignee: Fusionlayer OY (FI)

( * ) Notice: Subject to any disclaimer, the term of this patent is extended or adjusted under 35 U.S.C. 154(b) by 463 days.

This patent is subject to a terminal disclaimer.

(21) Appl. No.: 15/046,985

(22) Filed: Feb. 18, 2016

(65) Prior Publication Data

US 2016/0164750 A1    Jun. 9, 2016

Related U.S. Application Data

(63) Continuation-in-part of application No. 13/921,361, filed on Jun. 19, 2013, now Pat. No. 9,319,342.

(30) Foreign Application Priority Data

Jun. 20, 2012   (FI) ...................................... 20125680

(51) Int. Cl.
G06F 15/173    (2006.01)
H04L 12/24    (2006.01)
(Continued)

(52) U.S. Cl.
CPC .......... *H04L 41/22* (2013.01); *G06F 9/45558* (2013.01); *H04L 41/0273* (2013.01);
(Continued)

(58) Field of Classification Search
None
See application file for complete search history.

(56) References Cited

U.S. PATENT DOCUMENTS 7,802,000 B1    9/2010 Huang et al.
9,124,633 B1 *    9/2015 Eizadi .................. H04L 61/20
(Continued)

FOREIGN PATENT DOCUMENTS

EP    2216718 A1    8/2010
KR    101001413 A    4/2005
(Continued)

OTHER PUBLICATIONS

Search Report for Finnish Patent Application No. 20125680; dated Feb. 28, 2013.

*Primary Examiner* — Padma Mundur
(74) *Attorney, Agent, or Firm* — Barnes & Thornburg LLP

(57) ABSTRACT

A server computer (DNPS) commissions/decommissions networks provisioned using one or more orchestration solutions (OS) in a client-server architecture. Program code instructions instructing the server computer to implement a user interface (UI) for remote management of the server computer, wherein the user interface provides access to data managed by the server computer and a web-based application programming interface (API) that supports service oriented architecture ["SOA"], and a network management logic (NME) that dynamically assigns and releases networks via the one or more orchestration solutions (OS) and the web-based application programming interface (API). In an alternative implementation, the network management logic cooperates with Software-Defined Networking Controller(s) SDNC to commissions/decommission networks. A physical embodiment may implement either or both of the SOA-based and the SDN-based.

16 Claims, 8 Drawing Sheets

(51) Int. Cl.

| | |
|---|---|
| *H04L 29/06* | (2006.01) |
| *H04L 29/08* | (2006.01) |
| *G06F 9/455* | (2018.01) |
| *H04L 12/911* | (2013.01) |
| *H04L 29/12* | (2006.01) |
| *H04L 12/46* | (2006.01) |

(52) U.S. Cl.
CPC ........ *H04L 41/042* (2013.01); *H04L 41/5054* (2013.01); *H04L 47/70* (2013.01); *H04L 61/2007* (2013.01); *H04L 61/2061* (2013.01); *H04L 61/6068* (2013.01); *H04L 67/025* (2013.01); *H04L 67/1002* (2013.01); *H04L 67/42* (2013.01); *G06F 2009/45562* (2013.01); *G06F 2009/45595* (2013.01); *H04L 12/4641* (2013.01); *H04L 41/5096* (2013.01)

(56) References Cited

U.S. PATENT DOCUMENTS

| | | | |
|---|---|---|---|
| 2010/0205304 A1* | 8/2010 | Chaturvedi | ......... H04L 61/2015 709/226 |
| 2011/0090911 A1 | 4/2011 | Hao et al. | |
| 2013/0326599 A1 | 12/2013 | Bray et al. | |
| 2013/0346618 A1 | 12/2013 | Holkkola | |
| 2017/0171310 A1* | 6/2017 | Gardner | ............. H04L 67/1097 |

FOREIGN PATENT DOCUMENTS

| | | |
|---|---|---|
| KR | 100914036 A | 6/2009 |
| WO | 2014169289 A1 | 10/2014 |

* cited by examiner

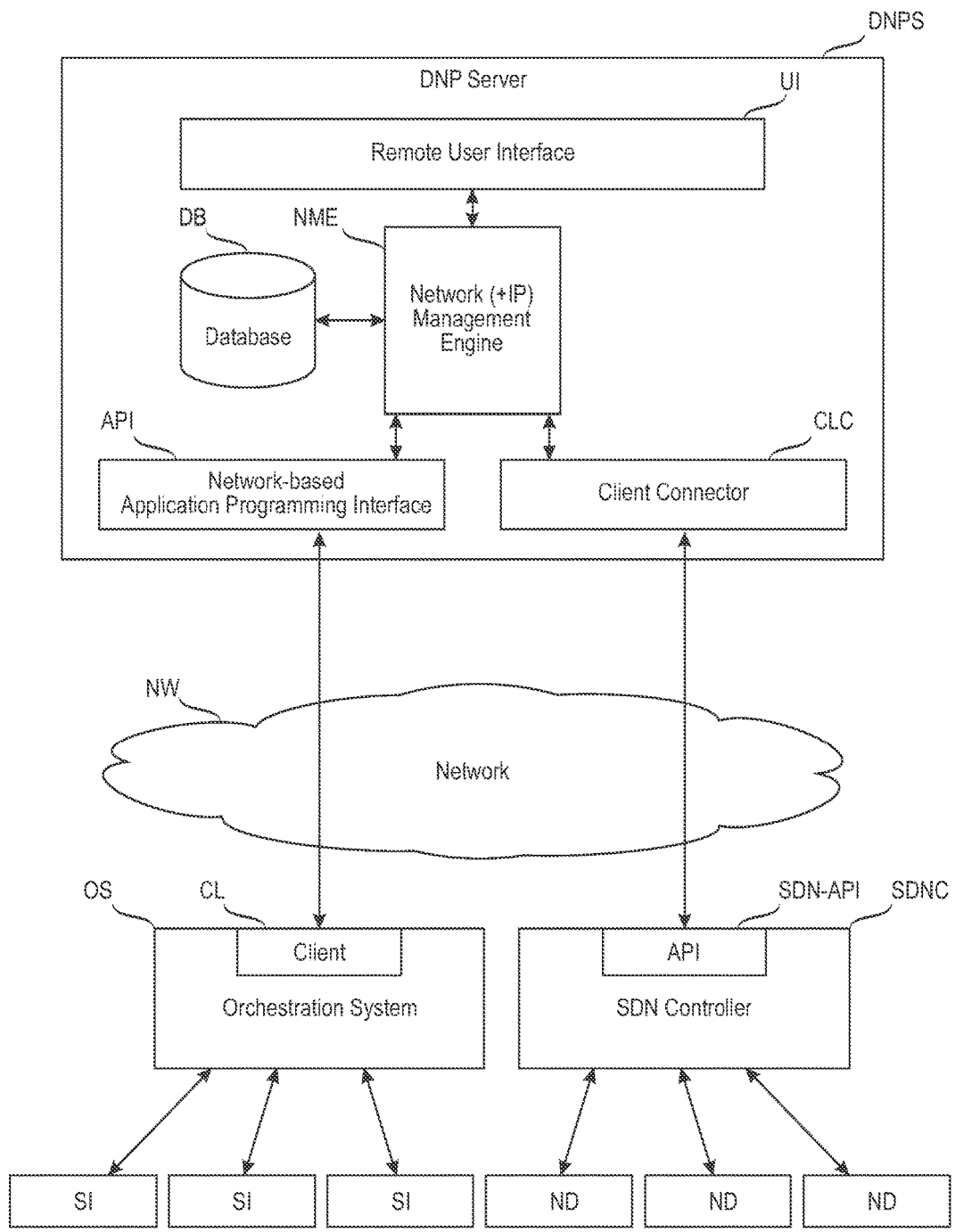

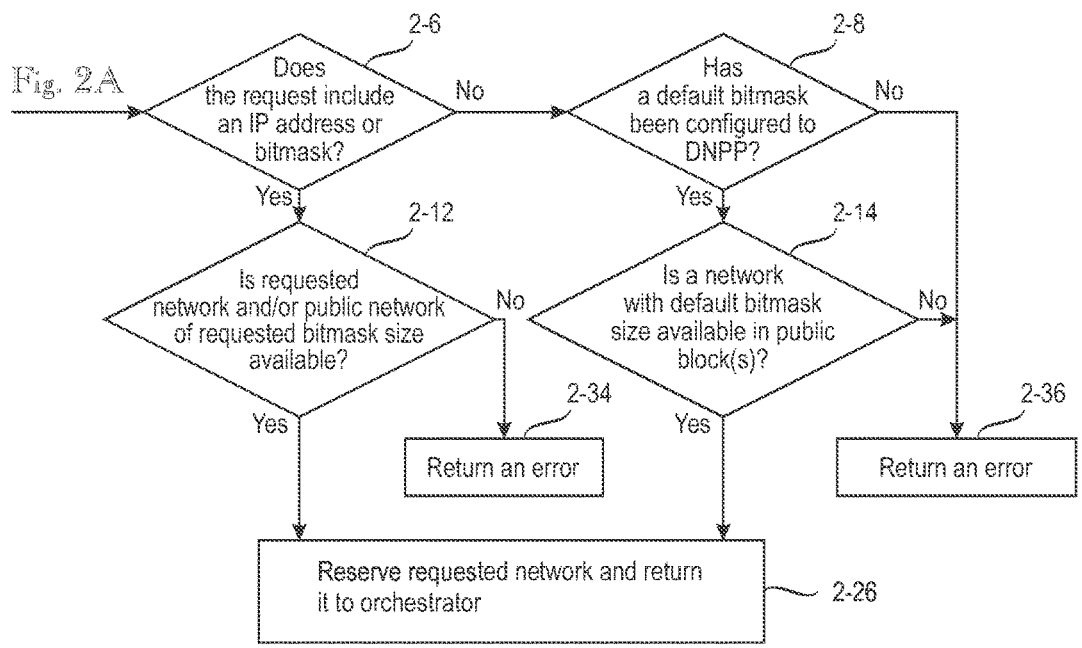

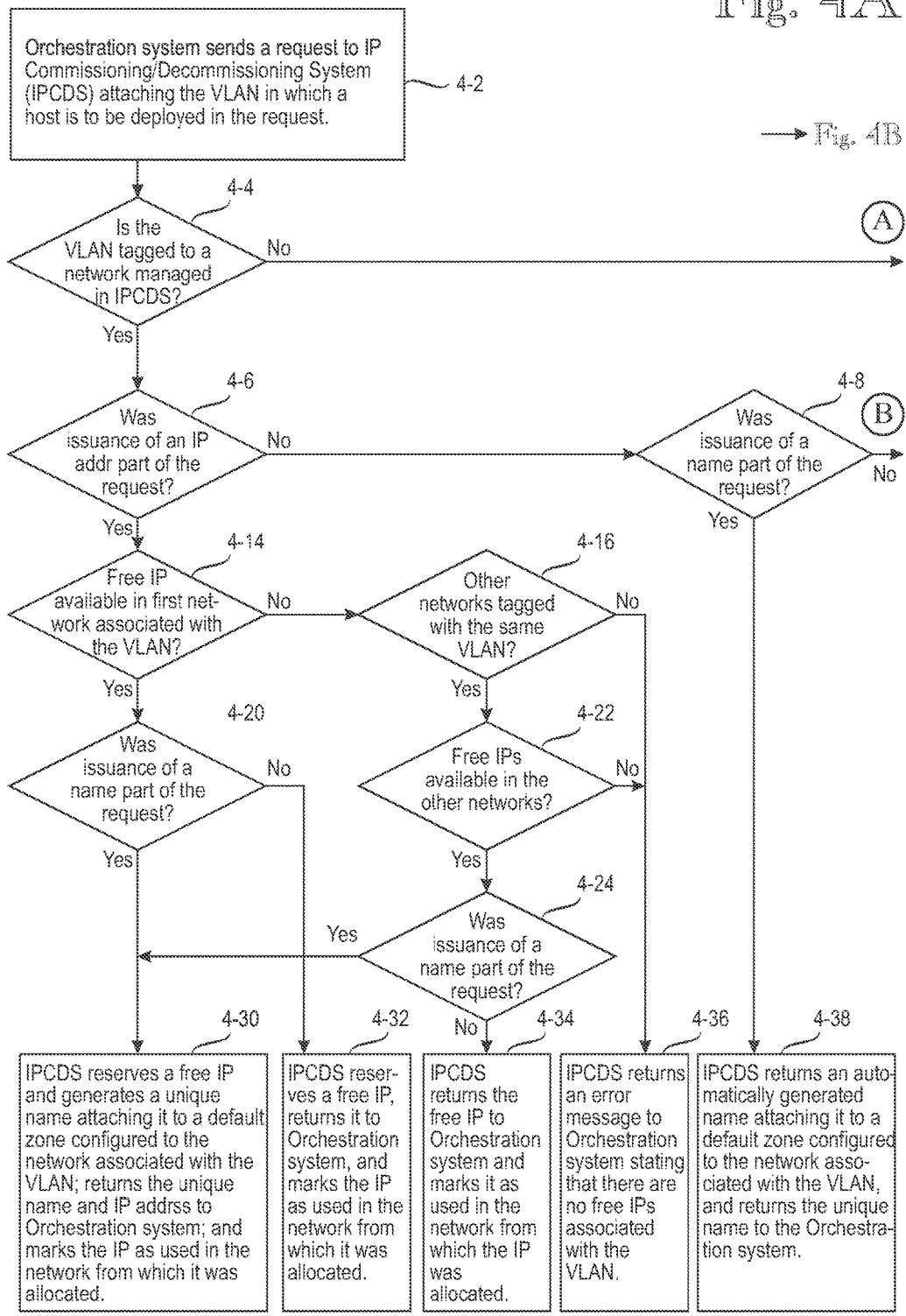

COMMISSIONING/DECOMMISSIONING NETWORKS IN ORCHESTRATED OR SOFTWARE-DEFINED COMPUTING ENVIRONMENTS

PRIOR CASE HISTORY

The present application is claims priority to, as a continuation-in-part application, commonly-owned U.S. patent application Ser. No. 13/921,361, entitled "Method and apparatus for IP commissioning and decommissioning in orchestrated computing environments", filed 19 Jun. 2013, published as US20130346618, which claims priority from Finnish patent application 20125680, filed 20 Jun. 2012 (the both of which being incorporated by reference in their entirety).

FIELD

The present invention relates to commissioning and decommissioning of IP networks and IP resources in cloud computing environments.

BACKGROUND

As has been known for a long time, Internet Protocol v. 4 (IPv4) is rather limited in terms of available address space. To address the issue, standard RFC1918 defines three networks intended for private use, namely 10.0.0.0 (Class A), 172.16.0.0 (Class B) and 192.168.0.0 (Class C). None of these private networks have been routed to the public internet. Large corporations and service providers typically have Class A network (10.0.0.0) address space to expand the address space available to them, while ADSL and cable modems commonly used in homes and small offices distribute IP addresses from private 192.168 networks. Connections to the outside world are provided by utilizing Network Address Translation (NAT) technology, wherein a NAT device located between the public and private networks acts as a bridge. Since several private networks share the same 10.0.0.0 address space, they are overlapping. Overlap has been an insignificant problem as long as these private networks have been run internally, instead of routing them to the public internet.

Overlapping of private networks becomes a problem in connection with cloud computing, or cloud-based services. For instance, IaaS (Infrastructure as a Service) service providers are increasingly deploying multi-tenant computing environments used to offer services concurrently to several business clients, all of whom may use the same 10.0.0.0 address space especially in the context of Virtual Private Cloud and/or other similar technologies. In use-cases such as this, the private networks used by different tenants typically overlap.

In the following description, "orchestration" is used in its established meaning within Service Oriented Architecture ("SON") realm, when discussing automated workflows between data processing and communication systems. Enterprises and service providers use orchestration solutions to align business requests with the applications, data and infrastructure. The said solutions are typically used to define the policies and service levels through automated workflows, provisioning, and change management. With this technology, organizations are able to create an application-aligned infrastructure that can be scaled up, down or sideways based on the needs of each application. Orchestration also provides centralized management of the resource pool, including billing, metering, and chargeback for consumption.

Allocation of IP addresses, names and other network parameters to the various servers, commonly referred to as workloads, which execute applications in orchestrated environments, has traditionally been accomplished by configuring an IP address in the said servers and by adding the server's name with the corresponding IP address to a domain name server (DNS) manually, or by having such allocation performed dynamically using Dynamic Host Configuration Protocol (DHCP) and dynamic DNS. Since the IP addresses and the names of the physical servers run in traditional orchestrated computing environments have been relatively static, their SOA-based automated workflow management processes have not been extended to integrate with IP and name commissioning mechanisms. As existing orchestration solutions are expanded to cloud-based computing environments, the traditional methods used to manage IP addresses and names described above will create various problems. For instance, as cloud-based computing paradigm requires that new virtual machines are provisioned on demand, the manual IP and name assignment process associated with the prior art methods used for allocation IP resources and names in traditional orchestrated computing environments quickly become a bottleneck as far as the scalability of the entire cloud-based computing environment is concerned. In addition, although the cloud-based on-demand computing paradigm requires that the life-cycle of a virtual server instance can be anywhere from minutes to several years, DHCP servers provide a predefined and fixed lease time for the automatically assigned IP addresses, thereby making it impossible to align the IP lease times with the dynamic nature of the virtual computing environment. Furthermore, the prior art techniques make it impossible to automatically reclaim an IP address when a virtual machine is decommissioned, as even with DHCP, the decommissioning is tied to the pre-defined lease time of the IP addresses that have been issued. The prior art methods thus make it impossible to align the lease time of an IP address with the unique life-cycle of each virtual machine run within the cloud.

Limitations of DHCP are quickly revealed by attempting to use in connection with cloud computing. One of the reasons for the poor compatibility between DHCP and cloud computing is that DHCP was never designed for cloud computing or web-based integration models. For instance, DHCP operates on OSI Layer 2 (L2). In practice, a client sends a broadcast message to a local-area network (LAN). A DHCP server in that LAN captures the broadcast message, inspects the client's Medium Access Control (MAC) address, which is a unique address of the network interface adapter, and returns an IP address with other network parameters to the MAC address. After that the client configures the network parameters for itself and is able to adopt a TCP/IP connection, which operates on higher OSI layers.

In practice, the above-described methodology requires that the client and the DHCP server must be interconnected by an L2 connection. In practice, the client and the DHCP server must be connected to the same LAN network. The LAN may be comprised of multiple VLAN networks, but these must be interconnected on L2 layer. In cases where clients have overlapping 10.0.0.0 address spaces, the service provider must isolate them from one another by configuring the overlapping address spaces into distinct LAN networks. As a result, all private networks are isolated from one another, which enables IP traffic within the network on one hand and prevents clients from accessing the networks of other clients.

A consequence of the facts that, firstly, DHCP operates on L2 and, secondly, overlapping address spaces must be isolated into separate LANs, is that a single DHCP cannot logically reside in multiple LANs separately. In other words, in the case of multiple private networks, each of them must have a dedicated DHCP server.

Internet Protocol version 6 (IPv6) provides two mechanisms for dynamic IP allocations. These mechanisms are called Stateful autoconfiguration and Stateless autoconfiguration. Neither autoconfiguration mechanism solves the above-identified problems because, firstly, stateful autoconfiguration (DHCPv6) is not really any different from DHCPv4 used in IPv4 environments. This is because each time an IP resource is allocated to a virtual machine, the allocated IP resource obtains a fixed lease value, which basically means that the IP resource shall remain allocated for a predefined period of time, regardless of whether or not the allocated IP resource actually continues to be utilized by the virtual machine. Within cloud-based environments, this is undesirable, because the IP addresses should be commissioned (issued) whenever a new virtual machine goes live, and (released) whenever that virtual machine is removed from the virtualized computing environment.

On the other hand, stateless autoconfiguration means that a client autonomously obtains an IP address on the basis of router advertisements. As far as SOA architectures and orchestration are concerned, there are two reasons why this scheme may not work. First, in environments where orchestration is used, it is a typical requirement that the IP address is obtained from a network that matches the Virtual Local Area Network (VLAN) in which a virtual machine is intended to run. In other words, the IP address has to be allocated from a specific network corresponding to the VLAN in which the virtual machine is to be deployed, instead of giving the virtual machine an arbitrary IP address that happens to be available (the latter is what stateless autoconfiguration leads to). The second reason why stateless autoconfiguration may not work in this use case is that the environments are typically multi-tenant environments where the administrator has to be able to actively monitor allocation levels of each network and determine what equipments and clients are being run in the networks. In the event that the IP addresses are obtained autonomously by the clients, there is no way to control the IP addresses which a given virtual machine will have obtained, nor will there be any transparency to this process that would allow the administrator to manage these relationships and/or track the allocation of IP allocations.

Commonly-owned patent application US20130346618 proposes solutions to the above-identified problems, by teaching techniques that allow multiple orchestrators (servers running orchestration solution) to obtain network parameters from a single authoritative source called IP commissioning/decommissioning server (="IPCDS"). The method taught in the commonly owned application can be used to provision network parameters from both elastic and traditionally switched networks so long as the networks have been recorded in the IPCDS system.

After deployment of the techniques proposed by the US20130346618 application, a number of related problems have been identified. For instance, TCP/IP networks are moving towards elastic architectures and process automation through technologies such as Software-Defined Networking (SDN). Benefits provided by such technologies include increased service agility through automated management and configuration processes, enhanced security through methodologies such as micro-segmentation, as well as service agility introduced by integration with automated service workflows and processes run by orchestrators responsible for deploying virtualized workloads and services, converged infrastructure, containers, or the like.

In many cases, however, SDN is not deployed in pure greenfield environments. Rather, SDN is often used to create networks inside network blocks that also contain traditionally switched networks based on the traditional TCP/IP networking model that dates back to the 1980s. Therefore, organizations that intend to use SDN must make sure that the new elastic networks and microsegments do not overlap with the traditional networks that have already been activated inside the same public IPv4 blocks, private IPv4 blocks and/or public IPv6 blocks (together, "shared network blocks").

As cloud stacks and SDN controllers typically allow free network prefixes to be manually configured into them, they are able to automatically assign networks from the prefixes that have been configured into them. However, a common source of problem is that the aforementioned technologies are not aware of the overall allocation status of the shared network blocks to which the said network prefixes belong. This makes service automation problematic in use cases such as Software-Defined Wide Area Networking (SD-WAN) or Network-as-a-Service (NaaS) in which the free network prefix(es) to be used by the SDN controller should be automatically located, reserved and/or assigned into the SDN controller as part of the service automation workflow.

Furthermore, when provisioning network parameters to one or more orchestrators responsible for deploying virtualized (network) services and workloads, converged infrastructure, containers or the like, it is required that the network parameters relating to both the elastic networks and the traditional networks are being provisioned from a single authoritative source (IPCDS), as the aforementioned resources connecting to the network are unaware of the method by which the underlying TCP/IP network has been set up. This enables orchestrated processes that are independent of the technologies that have been used to deploy the underlying TCP/IP networks.

To partially solve the problem, commonly-owned patent application publication US20130346618 teaches a method that allows multiple orchestrators to obtain network parameters from a single authoritative source (IPCDS). The method taught in the said application can be used to provision network parameters from both elastic and traditionally switched networks so long as the networks have been recorded in the IPCDS system. This typically requires manual deployment of the networks that provide the IP resources managed by the IPCDS.

Accordingly, there is still room for improvements in incorporating the management, the assignment and the release of network blocks and/or their contents into service automation workflows, as well as in the management and the automated assignment and/or releasing of network blocks, network prefixes and the alike into one or more SDN controllers.

DISCLOSURE

An object of the present invention is thus to provide methods, equipments and computer program products so as to alleviate one or more of the problems identified above. A particular object is to provide enhanced management of network blocks and their contents, including but not limited to public and private network blocks and the networks that fall under them, to enable automated assignment and release of the aforementioned resources as part of automated processes and/or workflows. In the present context, "content" of network block can be understood as follows. Parts of network blocks would be prefixes, networks and associated administrative data. The difference between a network prefix and a network is that a network is connected. A prefix is just a term for a subset of a block. There will always be a network prefix that matches a network, but not all prefixes match a network because a prefix can be split further into smaller prefixes. The overlapping private network blocks can co-exist in the same apparatus using techniques disclosed in said commonly-owned application US20130346618. The act of splitting the network blocks into prefixes, networks, subnetworks, microsegments or the alike may be carried out using tools that implement generally known algorithms used for the purpose. The logic that combines some or all of the aforementioned techniques will be referred to as Dynamic Network Provisioning Process or "DNPP".

The object of the invention is achieved by aspects of the inventions as defined in the attached independent claims. More specifically, the present invention provides methods, equipments and computer program products which can be used to manage, assign or release network blocks, network prefixes, networks subnetworks, microsegments and the alike as part of orchestrated or otherwise automated workflows, in a way that alleviates at least one of the problems described above. The dependent claims and the following detailed description and drawings relate to specific embodiments which solve additional problems and/or provide additional benefits.

One embodiment of the present disclosure is a server computer comprising a processing system comprising at least one processing unit storing applications and data. The server computer commissions/decommissions networks and provisions those to one or more orchestration solutions. The one or more orchestration solutions and the server computer constitute a client-server architecture. The processing system comprises program code instructions instructing the processing system to implement a user interface for the management of the server computer, wherein the user interface provides access to data managed by the server computer; a web-based application programming interface that supports service oriented architecture ["SOA"]; and a network management logic that dynamically assigns and releases networks and provisions those to one or more orchestration solutions and the web-based application programming interface.

Another embodiment of the present disclosure is a server computer comprising a processing system comprising at least one processing unit storing applications and data. The server computer commissions/decommissions networks to be activated/deactivated by one or more SDN controllers. The one or more SDN controllers and the server computer constitute a client-server architecture. The processing system comprises program code instructions instructing the processing system to implement a user interface for remote management of the SDN controller, wherein the user interface provides access to data managed by the SDN controller; a web-based client controller that communicates with an application programming interface of the SDN controller; and a network management logic that dynamically assigns and releases networks to be activated/deactivated by one or more SDN controllers.

A physical embodiment of the present disclosure can implement either or both of the SOA-based and SDN-based implementations.

Yet further embodiments of the present disclosure comprise methods and computer-readable memories storing program code instructions, wherein execution of the method or program code instructions in the server computer implements the features of either or both of the SOA-based and SDN-based server computers.

The present invention thus improves the Dynamic Network Provisioning Process (DNPP). Before the IPCDS technique described in the commonly-owned application US20130346618 can be used, the networks that are tagged and from which the IP resources are being commissioned, must be commissioned somehow, such as manually, for example. The present invention is based on the view that this network commissioning should be improved and automated. Before the IPCDS can work, the network needs to be activated and it needs to come from somewhere. The DNPP aims at solving this problem, by 1) describing how network blocks are being managed.

In a typical implementation, the DNPP client equipment comprises a client logic configured to perform the following tasks:
  requesting for one or more network blocks, network prefixes, networks, microsegments or the like, based on a tenant name, customer name or any other identifier that has been used in DNPP to reserve a given network block or a part of a given network block into a specific use; and
  triggering the release of one or more already assigned network blocks, network prefixes, networks, microsegments and the alike once the said resource is to be deactivated.

Other aspects of the invention include methods for operating the inventive DNPP server and DNPP client, and computer program products whose execution in appropriately equipped server and client computers provide them with features of the DNPP server and DNPP client and thus cause the DNPP server and DNPP client to carry out the inventive method. Alternatively, the DNPP logic may also be incorporated into another server and/or a client that also implements the IPCDS methodology described in commonly owned patent application US20130346618.

Because earlier attempts to solve the problems outlined by this invention have assumed only a single cloud stack, they are unable to solve the interoperability issues in environments that consist of multiple orchestrators, SDN controllers and/or existing services and/or infrastructure. Unlike earlier attempts to manage, assign and release network blocks and their contents in connection with orchestrated or otherwise automated workflows, or directly inside SDN controllers or as part of various cloud stacks, the present invention recognizes that network blocks used in production environments are typically shared between traditionally switched and elastic networks, and that seamless interoperability between the two requires that all contents of each network block are managed in a unified system that is authoritative for managing, assigning and releasing all network blocks and/or their contents under management regardless of which technologies are being used to activate, configure or switch the TCP/IP networks that fall inside a given network block.

According to a preferred but optional feature, the DNPP logic may also function as an integration layer between the orchestrated workflows used to deploy (network) services, applications, workloads, containers and the alike, and the SDN controllers that are responsible for the automated activation and ongoing configuration of the elastic networks. This optional method is used to assign and/or release network blocks or their contents as requested by the DNPP client, and to effect an associated change into a SDN controller that has been integrated, either directly or indirectly, with the apparatus that implements the DNPP server logic. The purpose of this optional method is to implement bidirectional (North-South) integration model whereby one or more orchestrators, on the Northbound, responsible for the business logic of various customer-interfacing portals are capable of offering available network prefixes, networks, subnetworks or microsegments to end-users (internal or external customers), potentially as a service; and whereby the said orchestrators on the Northbound may use the optional logic included in DNPP to automatically activate the network prefixes, networks, subnetworks and/or microsegments selected by the end-users, in one or more SDN controllers that have been integrated on the Southbound with DNPP.

The above-identified elements will be described in more detail in the following, wherein "southbound" and "northbound" interfaces are defined as follows. A northbound interface of a component conceptualizes the lower level details (eg, data or functions) used by, or in, the component. A northbound interface is used to interface with higher level layers using the southbound interface of the higher level component(s). A southbound interface decomposes concepts in the technical details, mostly specific to a single component of the architecture. Northbound and southbound interfaces are respectively drawn at the top and bottom of an architectural overview. Northbound interfaces normally talk to southbound interfaces of higher level components and vice versa. The invention involves, firstly, a Dynamic Network Provisioning Process (DNPP) that is used to manage and track, distribution and allocation of network blocks, individual network prefixes, networks, subnetworks and microsegments within each network block, related administrative properties and attributes, and to read the network configurations autonomously made by SDN controllers on the Southbound. Unlike conventional IP Address Management solutions that have been designed to manage networks, subnetworks and IP addresses manually by the network administrators and other Information Technology professionals, the DNPP according to the present invention is configured with all networks blocks and their existing contents used in the environment, after which it is capable of automatically assigning and/or releasing network blocks, network prefixes, networks, subnetworks, microsegments and the alike to service orchestrators on the Northbound and to the SDN controllers on the Southbound, and optionally to mediate the changes carried out either on the Northbound or on the Southbound to the orchestrator(s) and/or the controller(s) on the opposite side.

The DNPP thus has orchestrators setting up workloads (network hosts) on its Northbound side, and network infrastructure (including SDN Controllers) on its Southbound side. Technically, the difference here is that in Northbound integrations, the DNPP is the technology that has an API+ business logic, and the clients are situated in the orchestrators. In Southbound integrations (like SDN), the DNPP has a client+business logic, and the API is provided by the SDN Controller (or SD-WAN). Think scheme can be visualized as a stack, wherein each layer connecting downwards is the one with the client that is plugged "South" to an API.

The IPCDS includes an API and a business logic. The client is always in the orchestrator. The DNPP includes an API, a business logic and a client. The API is used when the DNPP gives out networks (broadly used) to an orchestrator, and in this case the client is in the orchestrator. But to push a network (again broadly) into a SDN controller or SD-WAN, we would actually use a client that's in our device, and use the API that is provided by the SDN or SD-WAN (or cloud stack).

One of the features of the present invention relates to situations wherein a network, subnetwork or a microsegment run in the elastic network environment ceases to exist or is migrated to another elastic network environment. This is possible in next-generation network environments in which networks are treated as an on-demand resource, activated and reactivated automatically as needed. In the prior art, lack of accurate information on which network resources are being used and which are merely assigned but not used makes it impossible create an automated service workflow around the assignment and the release of network resources. In the present invention, the client running in the orchestration system may notify the DNPP when a network is about to be decommissioned, or is migrated to another elastic network environment or SDN controller, as the case may be. Alternatively, information on the released network resource may be obtained by reading it from the configurations of an integrated SDN controller. As a result of this information, the inventive DNPP process will automatically release the resources, such as the network prefix, formerly assigned to a network that no longer exists. The DNPP of the present invention communicates with the orchestration system and/or the integrated SDN controller when the said system is deactivating or migrating networks to another environment. Use of client-server architecture provides the benefit that the inventive DNPP process may obtain real-time information concerning whether or not a given network resource is actually being used for anything.

The invention relates to orchestrated computing environments that utilize API-based architectures, and in which the network resource allocation should be carried out as part of the activation and/or deactivation process managed by the orchestration system and/or the SDN controller.

The DNPP process further comprises a remote user interface, such as a web-based user interface, which can be used to access the data managed in/by the DNPP process. The remote user interface provides the ability to track allocation and usage levels of network blocks in very close to real-time. Other desirable features include the ability of administrators to transparently monitor these levels in real-time; to support multi-tenant environments, including the possibility to offer internal and/or external end-users a restricted access/viewing rights to the network blocks used by them; and the ability to manage network blocks by tagging the select attributes or properties to them. The reason why the last part is important is that in order to assign network prefixes, networks, subnetworks, microsegments and the alike from the correct network block, the network block must be tagged with one or more unique identifiers present in the client calls. And to manage all this, a graphical user interface (GUI) is preferable for many administrative users.

The DNPP process further comprises an Application Programming Interface (API) that supports Service Oriented Architecture (SOA) plus a first logic capable of dynamically assigning and releasing network resources, such as network blocks, network prefixes, networks, subnetworks or microsegments based on calls received via the API.

The DNPP process further comprises a second logic configured to associate individual network blocks and/or network prefixes with given customer and, in the event that a network block and/or assigned network prefixes are full, the DNPP process is configured to automatically provision a network resource, (e.g. a network prefix) from an alternate network block with the customer and/or from a reserve pool of network resources.

Yet further, the DNPP process comprises a client-server architecture that involves a client run in the orchestration solution communicating with the DNPP process over SOA-based API. In an alternative embodiment, the DNPP also contains one or more client software implementations whereby the client-server architecture is comprised between the DNPP (client) and a SDN controller (server).

As regards the client, the client comprises a client logic that requests a network resource, such as a network block, network prefix, network, subnetwork or a microsegment, from the DNPP process when a new network is to be deployed by the orchestration solution. In case the optional embodiment is implemented in DNPP, the client implemented in the DNPP picks up the network resource assigned to the orchestrator, and sends the same network resource to the integrated SDN controller for activation. Alternatively, the client implemented in the DNPP may also pick up a network resource from the DNPP process and send the network resource to the integrated SDN controller for activation, without involving any orchestrator in the said process.

The Dynamic Network Provisioning Process ("DNPP") logic is accessible via a graphical user interface (GUI), command line interface (CLI) and/or and application programming interface (API), and may also be used to automatically allocate suitable network prefixes through calls made by third-party systems such as service orchestrators via the API.

The DNPP may be implemented as a standalone apparatus (server) when used to provision network definitions to third-party orchestrators. As used herein, a network definition means information (set of parameter) defining which of several networks is meant. An illustrative list of network definitions includes free network prefixes, subnetworks, network masks (netmasks) or the like. If the DNPP is implemented as a server, it may be called a Dynamic Network Provisioning Server or "DNPP Server". In most occurrences, DNPP and DNPP Server are interchangeable.

The DNPP searches for such free network definitions based on unique identifiers including but not limited to tenant and/or customer name associated with each managed network block. The DNPP then reserves a network resource of requested or configured size using the calculation tools included in the system; and, depending on the use case, either just returns the reserved network resource to the orchestrator, or returns the reserved network resource to the orchestrator and pushes it to an integrated SDN Controller (SDNC) or SD-WAN Controller (SDWANC) through an interface offered by the SDNC and/or SDWANC for service and/or network activation.

Additionally, once the network resource has been pushed into the SDNC and/or SDWANC, the DNPP starts polling the integrated SDNC and/or SDWANC for the automatically configured network parameters and other pieces of information available via the interface provided by the SDNC and/or the SDWANC. As network parameters and other information are discovered, the DNPP then retrieves this information and stores it in the apparatus for later use. Uses for such data include but are not limited to viewing and managing the automatically configured data, and the provisioning of the stored data to third-party orchestrators, as appropriate.

Additionally, in the event that the retrieved data is used to provision network parameters, the logic may be combined with US Patent Application no. USD20130346618 to carry out the provisioning as taught by the said patent application to third-party orchestrators.

BRIEF DESCRIPTION OF THE DRAWINGS

In the following the invention will be described in greater detail by means of specific embodiments with reference to the attached drawings, in which:

FIG. 1 is a block-level diagram of client-server architecture according to an embodiment of the invention;

DETAILED DESCRIPTION OF SPECIFIC EMBODIMENTS

Figure 2A:
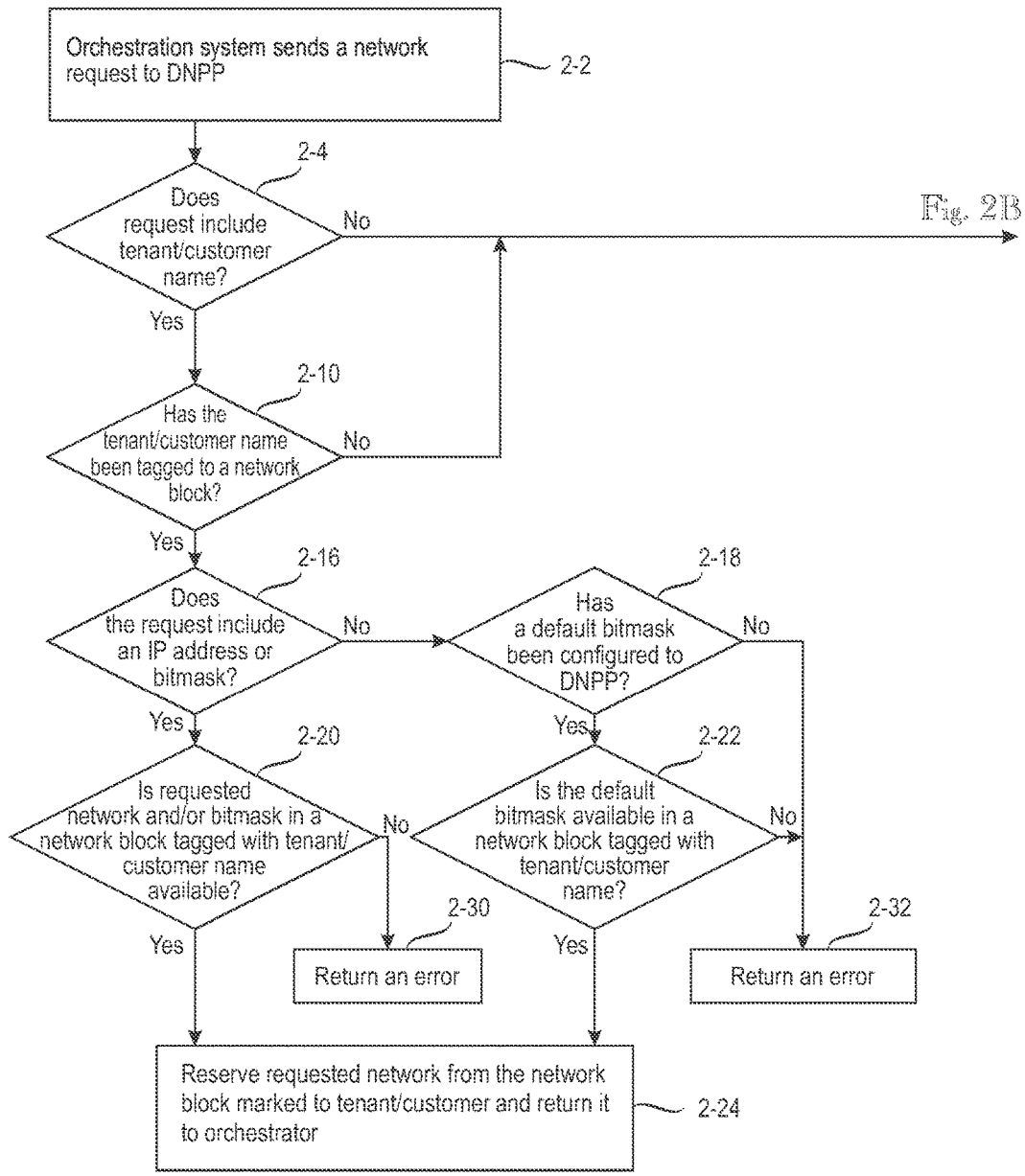
FIG. 2, which consists of partial drawings 2A and 2B, is a flow chart illustrating operation of a Dynamic Network Provisioning Process (DNPP) server during processing of a network request from an orchestration system.

FIG. 1 is a block-level diagram of a client-server architecture according to an embodiment of the invention. Reference sign DNPS denotes a dynamic network provisioning server, which implements the above-described dynamic network provisioning process (DNPP). Reference sign UI denotes a user interface, which preferably is a remote user interface, such as a web-based user interface. The user interface can be used to access data, which the DNPS server manages in a database DB. Reference sign NME denotes a network management engine, which implements various management logics relating to commissioning/decommissioning networks and, optionally, IP resources within the managed networks.

FIG. 1 shows an ambitious embodiment having two parallel mechanisms for dynamic commissioning/decommissioning of networks. The left side of FIG. 1, below the network management engine NME, relates to an implementation, which utilizes one or more orchestrators (servers running orchestration solution). Reference sign API denotes an application programming interface in the network management engine NME that supports Service Oriented Architecture (SOA) to a client (client connector) in an orchestrator OS. The right side of FIG. 1, below the network management engine NME, relates to an implementation, which utilizes one or more Software-Defined Networking Controllers SDNC. For the SDNC-based implementation, the network management engine NME has a client connector CLC, which connects to an application programming interface in the SDN controller, denoted SDN-API. An embodiment of the network management engine NME according to the present disclosure can implement either or both of the SOA-based implementation and the SDN-based implementation.

The logics implemented by the network management engine NME dynamically assigns and releases network resources, such as network blocks, network prefixes, networks, subnetworks or microsegments based on requests received via the application programming interface API and/or the client connector CLC. The network management engine NME further associates individual network blocks and/or network prefixes with given customers and, in the event that a network block and/or assigned network prefixes are full, automatically provisions a network resource, (eg a network prefix) from an alternate network block with the customer, and/or from a reserve pool of network resources.

For the SOA-based implementation, reference sign CL denotes a client computer of the client-server architecture. The client computer CL runs in, or in connection with, an orchestration solution OS communicating with the DNPS server over the SOA-based application programming interface API. The orchestration solution OS supports a number of server instances SI. In a typical implementation the server instances SI are virtual machines VM, each of which has a respective workload. The DNPP server is shown as a separate server from the orchestration system (orchestrator) OS, but integrated implementations are equally possible. The SDN-based implementation operates in an analogous manner to the SOA-based one. Either or both technologies can be implemented in one physical embodiment.

FIG. 2, which consists of partial drawings 2A and 2B, is a flow chart illustrating detailed processing steps in an embodiment of a DNPP process, during processing of a network request from an orchestration system OS. For the purposes of FIG. 2, DNP Process ("DNPP") and DNP Server ("DNPS") are interchangeable. "Server" implies a dedicated server, while "process" implies that the functionality may be provided via other implementations, such as distributed servers and/or servers also used for other purposes.

In step 2-2 the orchestration system OS sends a network request, which is received by the DNPP. In step 2-4 the DNPP checks if the network request includes a tenant/customer name. If so, the process proceeds to step 2-10, in which the DNPP checks if the tenant/customer name has been tagged to a network block. If so, the process proceeds to step 2-16, in which the DNPP checks if the request includes an IP address or bitmask. If it does, the DNPP checks, in step 2-20, if the requested network and/or bitmask in a network block tagged with tenant/customer name is available. If the result of all checks 2-4, 2-10, 2-16 and 2-20 are positive, the DNPP proceeds to step 2-24, in which it reserves the requested network from the network block marked to the tenant/customer and returns it to the orchestrator.

If the check 2-16 returns a negative result, the DNPP checks, in step 2-18, if a default bitmask has been configured to the DNPP. If so, the process proceeds to step 2-22 to check if the default bitmask is available in the network block tagged with the tenant/customer name. If it is, the process proceeds to step 2-24, which has been described earlier.

The logic being described here is based on the view that the network would be primarily assigned based on a customer (tenant) name, which would be tagged to the network block or possibly to a given prefix under it. If there is no tenant or customer name, the second possibility is that the orchestrator would be either a) requesting a specific prefix from a given network block (this would be written as IP/bitmask, eg 123.123.123.123/28), or b) requesting for a specific bitmask (eg just/28). If neither a) nor b) applies, then the chances are that a default-sized network would be coming from a public block/prefix where the only requirement is that the assignment doesn't overlap. If a specific bitmask size is requested (but no IP address in front of it), then the assignment would likely be a suitably sized network from a public block/prefix. A further assumption here is that if the request includes IP address/prefix, it could be coming from either a private or a public block. If it's just prefix (without IP address), then logically one would default to a public block.

If either check 2-4 or 2-10 returns a negative result, the DNPP proceeds to step 2-6, in which the DNPP checks if the request includes an IP address or bitmask. If so, the DNPP checks, in step 2-12, if the requested network and/or public network of the requested bitmap size is available. If it is, the DNPP reserves the requested network and returns it to the orchestrator in step 2-26. If the check 2-6 returns a negative result, the DNPP checks in step 2-8 if a default bitmask has been configured to the DNPP. If yes, the process proceeds to step 2-14 for checking if a network with the default bitmask size is available in public block(s). If it is, the DNPP reserves the requested network and returns it to the orchestrator in step 2-26.

If any of the checks 2-8, 2-12, 2-14, 2-18, 2-20 or 2-22 returns a negative result, the process proceeds to one of steps 2-30, 2-32, 2-34 or 2-36, for returning an error condition. The flow chart of FIG. 2 shows an identical legend for all error indications, but the detailed error conditions and indications may differ.

FIG. 2 thus illustrates operation of an ambitious embodiment, wherein the network management engine NME can assign networks in multiple ways (as shown, via processes leading through steps 2-20, 2-22, 2-12 and 2-14). A less ambitious embodiment may implement any subset of these processes.

Figure 3:
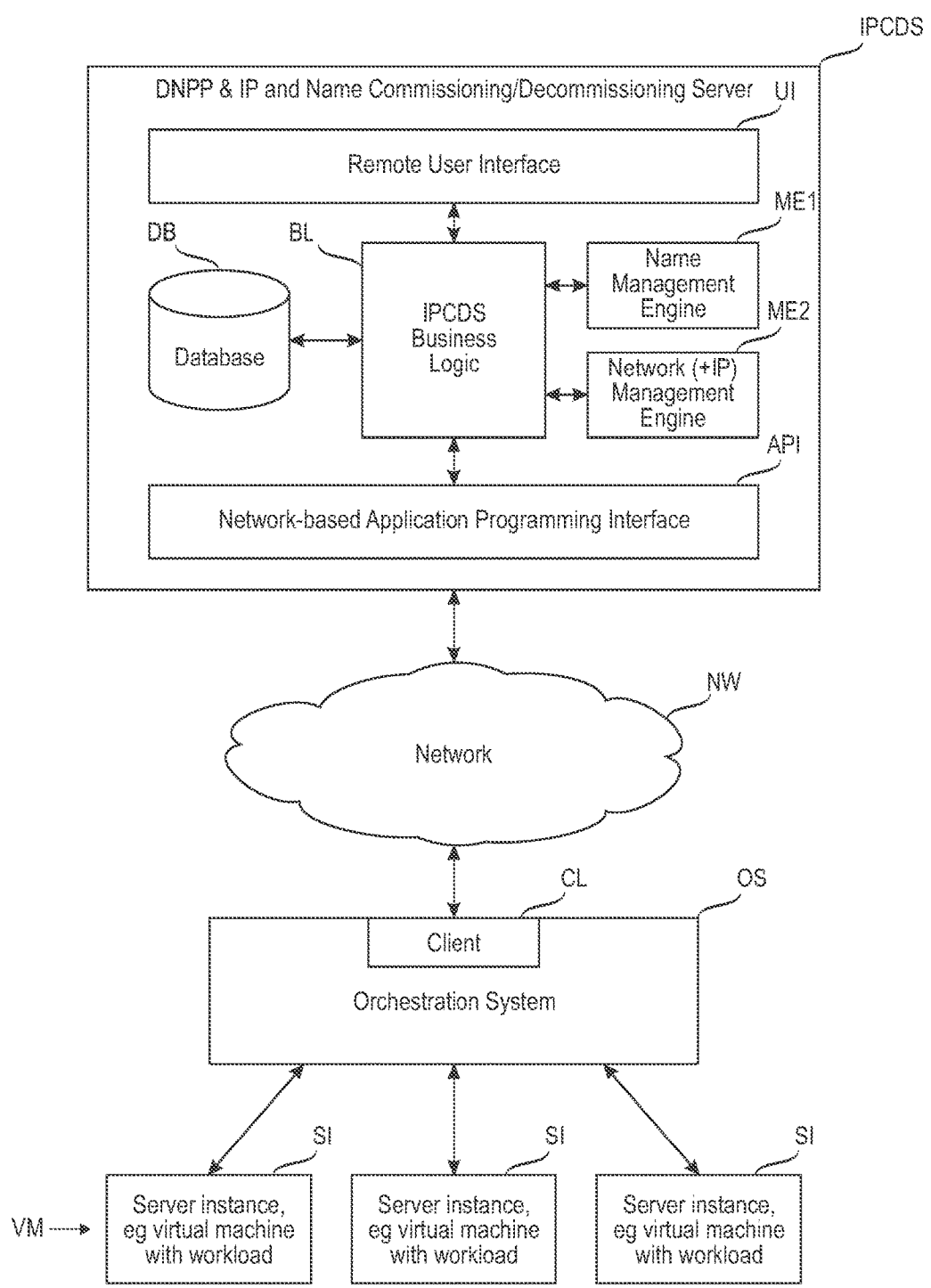
FIG. 3 is a block-level diagram of combined Dynamic Network Provisioning (DNP) server and IP Commissioning/Decommissioning (IPCD) server.

FIG. 3 is a block-level diagram of a client-server architecture according to an embodiment of the invention. Reference sign IPCDS denotes an IP Commissioning/Decommissioning server (IPCD server). Reference sign UI denotes a user interface, which preferably is a remote user interface, such as a web-based user interface. The user interface can be used to access the data managed in the IPCDS server. Reference sign API denotes an Application Programming Interface that supports Service Oriented Architecture (SOA). Reference sign BL denotes a business logic, which is capable of dynamically assigning and releasing IP resources, such as IP addresses, names, and other network configurations based on calls received via the API. The present embodiment of the IPCDS server comprises two management engines ME1 and ME2, which respectively correspond to the first logic and second logic, and which are collectively configured to associate individual networks with given end-users and, in the event that a network has been fully allocated, the IPCDS server is configured to automatically provision an IP resource, (eg an IP address) from an alternate network associated with the internal and/or external end-user and/or from a reserve pool of IP resources.

Reference sign CL denotes a client computer of the inventive client-server architecture. The client computer CL runs in, or in connection with, an orchestration solution OS communicating with the IPCDS server over the SOA-based Application Programming Interface API. The orchestration solution OS supports a number of server instances SI. In a typical implementation the server instances SI are virtual machines, each of which has a respective workload.

Figure 4B:
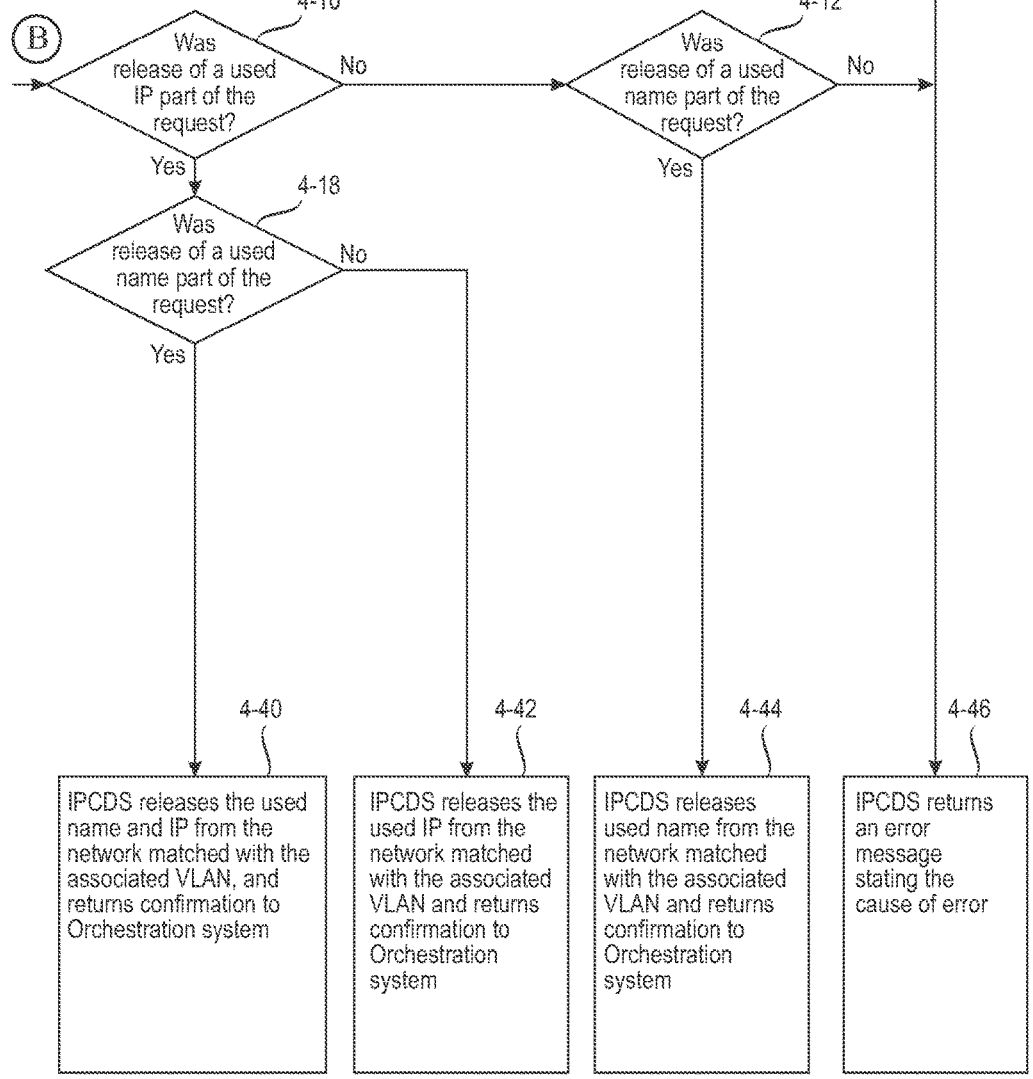
FIG. 4, which consists of partial drawings 4A and 4B, is a flow chart illustrating operation of an IPCD server according to an embodiment of the invention.

FIG. 4, which consists of partial drawings 4A and 4B, is a flow chart illustrating operation of an IPCDS server according to an embodiment of the invention. In step 4-2 the orchestration system sends a request to the IPCDS server, wherein the request identifies the virtual local-area network VLAN in which a host is to be deployed. In step 4-4 the IPCDS server examines whether the VLAN is tagged to a network managed by the present IPCD system. If not, the flow proceeds to step 4-46 (see drawing 2B), wherein the IPCDs server returns an error message stating the cause of the error. If in step 4-4 the outcome is positive, the flow proceeds to step 4-6, wherein the IPCDs server examines whether issuance of an IP address was part of the request. If yes, the flow proceeds to step 4-14, wherein the IPCDs server examines if a free IP address is available in the first network associated with the VLAN. If yes, the flow proceeds to step 4-20, wherein the IPCDs server examines if issuance of a name was part of the request. If it was, the flow proceeds to step 4-30, wherein the IPCDs server reserves a free IP address and generates a unique name attaching it to a default zone configured to the network associated with the VLAN. The IPCDs server then returns the unique name and IP address to the orchestration system OS and marks the IP address as used in the network from which it was allocated. If the outcome of step 4-20 was negative, the flow proceeds to step 4-32, wherein the IPCDs server reserves a free IP address, returns it to the orchestration system OS, and marks the IP address as used in the network from which it was allocated.

If the outcome of step 4-6 was negative, the flow proceeds to step 4-8, wherein the IPCDs server examines whether issuance of a name was part of the request. If yes, the flow proceeds to step 4-38, wherein the IPCDs server returns an automatically generated name attaching it to a default zone configured to the network associated with the VLAN, and returns the unique name to the orchestration system OS. If the outcome of step 4-8 was negative, the flow proceeds to step 4-10, wherein the IPCDs server examines whether release of an IP address was part of the request. If yes, the flow proceeds to step 4-18, wherein the IPCDs server examines whether release of a used name was part of the request. If yes, the flow proceeds to step 4-40, wherein the IPCDs server releases the used name and IP address from the network that matched the associated VLAN, and returns a confirmation to the orchestration system OS. If the outcome of step 4-18 was negative, the flow proceeds to step 4-42, wherein the IPCDs server releases the used IP from the network matched with the associated VLAN and returns a confirmation to the orchestration system OS.

In the present example, if the outcome of step 4-10 was negative, the flow proceeds to step 4-12, wherein the IPCDs server notices that the request did not relate to any of the functions of the IPCD server, and returns an error message. In more ambitious implementations with more functions, the branch from step 4-12 to the right may proceed to further tests and functions.

If the outcome of step 4-14 was negative, the flow proceeds to step 4-16, wherein the IPCDs server examines if there are other networks tagged with the same VLAN. If there are, the flow proceeds to step 4-22, wherein the IPCDs server examines if there are free IP addresses in the other networks. If there are, the IPCDs server examines in step 4-24 if issuance of a name was part of the request. If yes, the flow proceeds to the above-described step 4-30. If not, the flow proceeds to step 4-34, wherein the IPCDs server returns the free IP address to the orchestration system OS and marks it as used in the network from which the IP was allocated.

If the outcome of step 4-16 or 4-22 is negative, the flow proceeds to step 4-36, wherein the IPCDs server returns an automatically generated name attaching it to a default zone configured to the network associated with the VLAN, and returns the unique name to the orchestration system OS.

Figure 5:
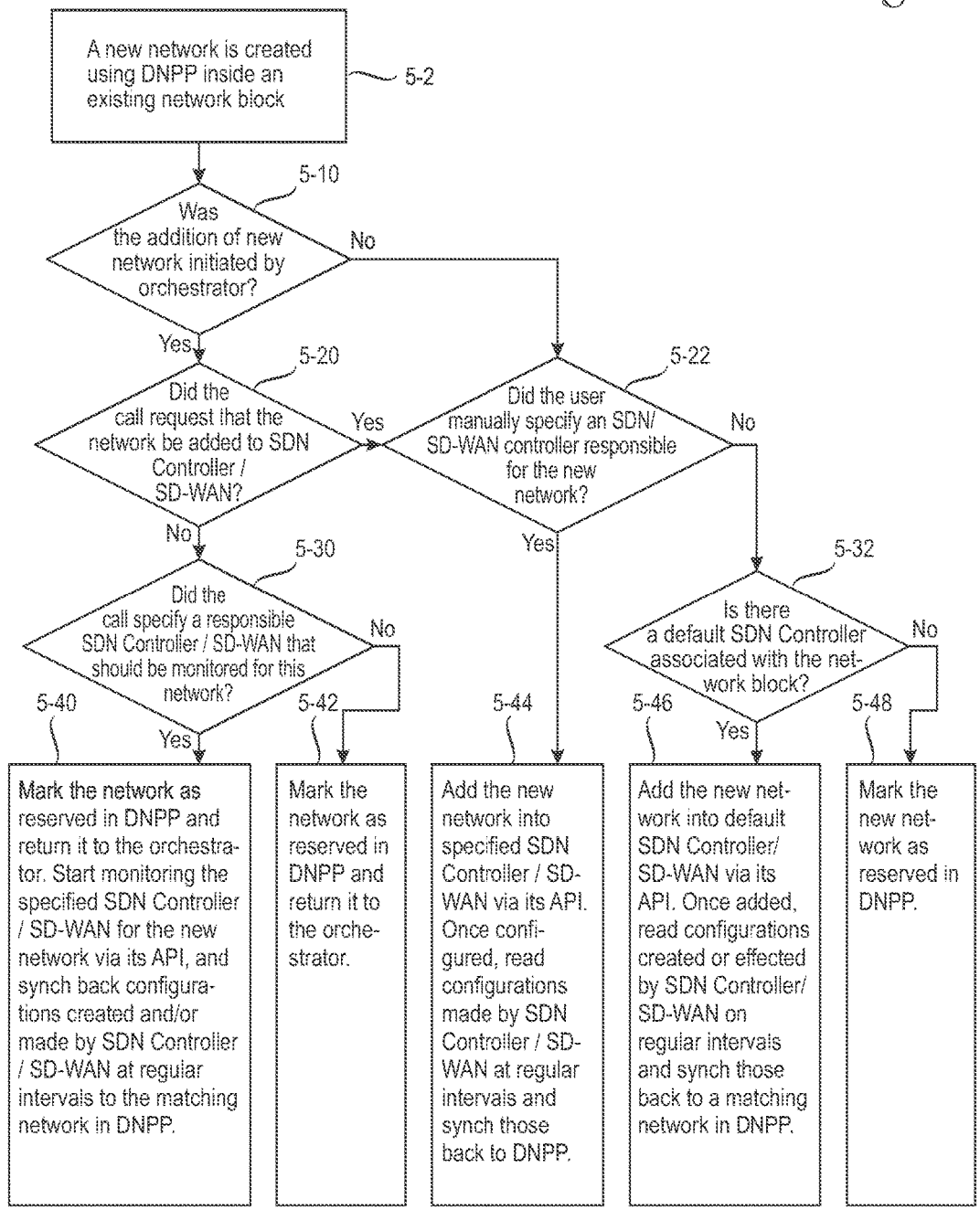
FIG. 5 is a flow chart illustrating various optional features of a Dynamic Network Provisioning Process (DNPP)

FIG. 5 is a flow chart illustrating various optional features of a Dynamic Network Provisioning Process (DNPP). In step 5-2, the DNPP server creates a new network inside an existing network block. In step 5-10, the DNPP server checks whether the addition of the new network was initiated by an orchestrator. If yes, the flow proceeds to step 5-20. If not, the flow proceeds to step 5-22. In step 5-20, the DNPP checks if the call requested that the network be added to SDN Controller or SD-WAN. If so, the flow proceeds to step 5-22, wherein the DNPP checks if the user manually specified an SDN/SD-WAN controller responsible for the network.

If the outcome of check 5-20 is negative, the flow proceeds to step 5-30, wherein the DNPP checks if the call specified a responsible SDN Controller or SD-WAN that should be monitor for the network. If so, the flow proceeds to step 5-40, wherein the DNPP marks the network as reserved in the DNPP and returns it to the orchestrator. It also starts monitoring the specified SDN Controller/SD-WAN for the new network via its API, and synchronizes back configurations created and/or made by the SDN Controller/SD-WAN on regular intervals to the matching network in DNPP.

If the outcome of check 5-30 is negative, the flow proceeds to step 5-42, wherein, the DNPP marks the network as reserved in the DNPP and returns it to the orchestrator, thus omitting the SDN-related monitoring and synchronization aspects of step 5-40.

If the outcome of check 5-22 is positive, and the user manually specified an SDN/SD-WAN controller responsible for the network, the flow proceeds to step 5-44, wherein the DNPP adds the new network into the specified SDN Controller/SD-WAN via its API. Once configured, the DNPP reads configurations made by the SDN Controller/SD-WAN at regular intervals and synchronizes those back to the DNPP.

If the outcome of check 5-22 is negative, the flow proceeds to step 5-32, wherein, the DNPP checks whether a default SDN controller associated with the network block exists. If so, the flow proceeds to step 5-46, wherein the DNPP adds the new network into the default SDN Controller/SD-WAN via its API. Once added, the DNPP reads configurations created or effected by the SDN Controller/SD-WAN at regular intervals and synchronizes those back to a matching network in the DNPP. Finally, if the outcome of check 5-32 is negative, the flow proceeds to step 5-48, wherein the DNPP marks the network as reserved in the DNPP.

Figure 6:
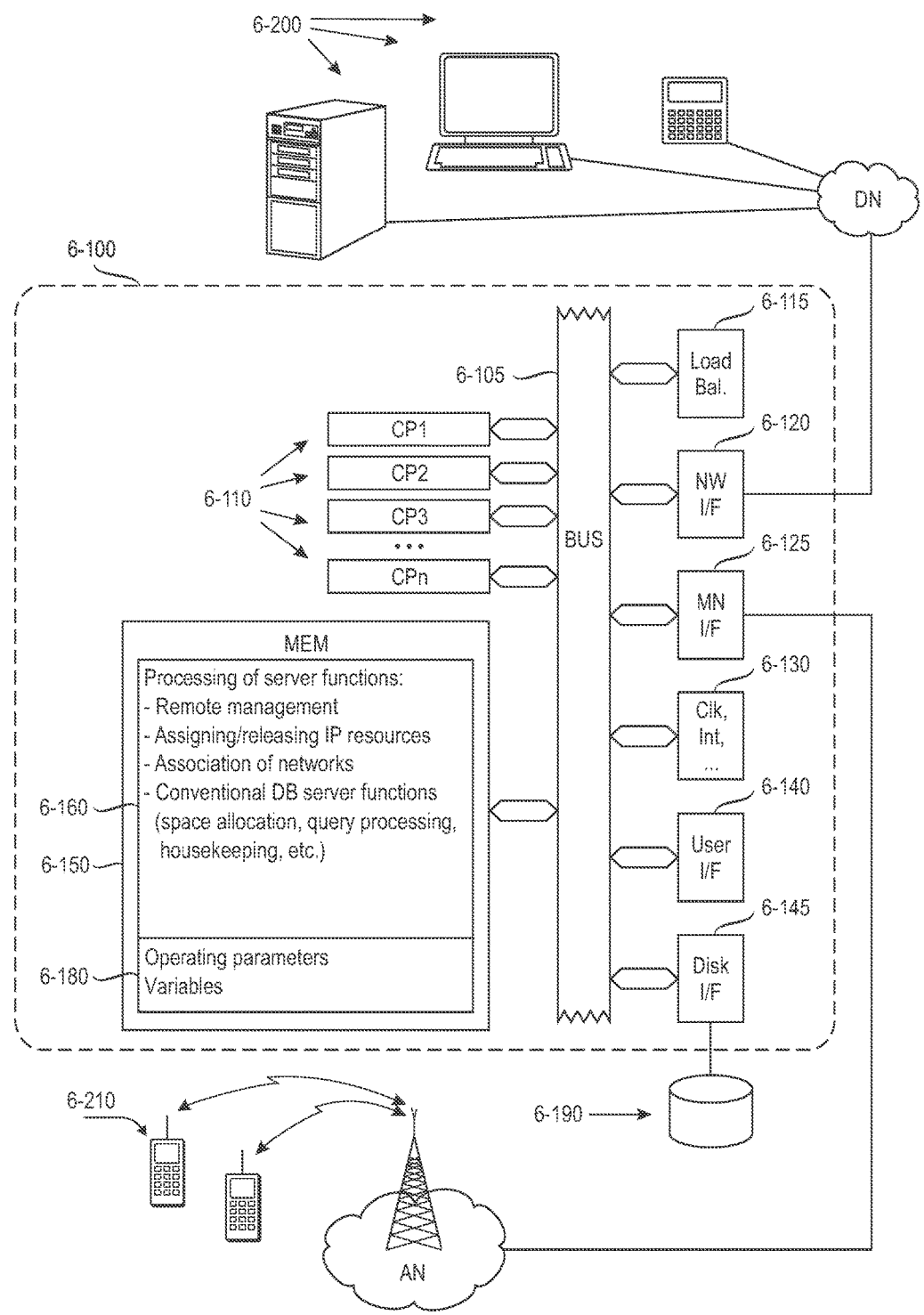
FIG. 6 schematically shows an exemplary block diagram for the various server and/or client computers.

FIG. 6 schematically shows an exemplary block diagram for the various information processing elements. The data processing architecture shown in FIG. 6, generally denoted by reference numeral 6-100, can be used to implement the servers and clients of the present invention. A configuration appropriate for a server is shown; the configuration of a client computer may be simpler. The two major functional blocks of the data processing architecture are a processing system 6-100 and a storage system 6-190. The processing system 6-100 comprises one or more central processing units CP1 . . . CPn, generally denoted by reference numeral 6-110. The processing units may be native or virtual processing units. Embodiments comprising multiple processing units 6-110 are preferably provided with a load balancing unit 6-115 that balances processing load among the multiple processing units 6-110. The multiple processing units 6-110 may be implemented as separate processor components or as physical processor cores or virtual processors within a single component case. The processing system 6-100 further comprises a network interface 6-120 for communicating with various data networks, which are generally denoted by reference sign DN. The data networks DN may include local-area networks, such as an Ethernet network, and/or wide-area networks, such as the internet. Reference numeral 6-125 denotes a mobile network interface, through which the processing system 6-100 may communicate with various access networks AN, which serve wireless network nodes. A configuration supporting multiple different networks enables the processing system 6-100 to support multiple types of clients, such as land-based terminals 6-200 and mobile terminals 6-210.

The processing system 6-100 of the present embodiment may also comprise a local user interface 6-140. Depending on implementation, the user interface 6-140 may comprise local input-output circuitry for a local user interface, such as a keyboard, mouse and display (not shown). Alternatively or additionally, management of the processing system 6-100 may be implemented remotely, by utilizing the network interface 6-120 and any internet-enabled terminal that provides a user interface. The nature of the user interface depends on which kind of computer is used to implement the processing system 6-100. If the processing system 6-100 is a dedicated computer, it may not need a local user interface, and the processing system 6-100 may be managed remotely, such as from a web browser over the internet, for example. Such remote management may be accomplished via the same network interface 6-120 that the computer utilizes for traffic between itself and the client terminals.

The processing system 6-100 also comprises memory 6-150 for storing program instructions, operating parameters and variables. Reference numeral 6-160 denotes a program suite for the processing system 6-100.

The processing system 6-100 also comprises circuitry for various clocks, interrupts and the like, and these are generally depicted by reference numeral 6-130. The processing system 6-100 further comprises a storage interface 6-145 to the storage system 6-190. When the processing system 6-100 is switched off, the storage system 6-190 may store the software that implements the processing functions, and on power-up, the software is read into semiconductor memory 6-150. The storage system 6-190 also retains operating and variables over power-off periods. In large-volume implementations, that is, implementations wherein a single processing system 6-100 serves a large number of clients via respective mobile terminals MT, the storage system 6-190 may be used to store the dynamic dialog matrices associated with the clients and mobile terminals MT. The various elements 6-110 through 6-150 intercommunicate via a bus 6-105, which carries address signals, data signals and control signals, as is well known to those skilled in the art.

It will be apparent to a person skilled in the art that, as the technology advances, the inventive concept can be implemented in various ways. The invention and its embodiments are not limited to the examples described above but may vary within the scope of the claims.

The invention claimed is:

1. A server computer comprising:
a processing system comprising at least one processing unit storing applications and data; wherein the server computer commissions/decommissions networks and provisions the said networks to one or more orchestration solutions;
wherein the one or more orchestration solutions and the server computer constitute a client-server architecture;
wherein the processing system comprises program code instructions instructing the processing system to implement the following features:
a user interface for the management of the server computer, wherein the user interface provides access to data managed by the server computer;
a web-based application programming interface that supports service oriented architecture ["SOA"]; and
a network management logic that dynamically assigns and releases networks and provisions the said networks to one or more orchestration solutions and the web-based application programming interface,
wherein the network management logic dynamically assigns and releases network blocks and individual network prefixes, networks, subnetworks and microsegments within each network block.

2. The server computer of claim 1, wherein the network management logic processes a request in which a network requested and assigns the requested network from a network block if at least one of the following conditions are true:
the request specifies a network block or prefix that has been tagged to the network user;
the server computer has configured a default bitmask, which is available in a network block tagged to the network user;
the request indicates an IP address or bitmask and the requested network and/or a public network of a size corresponding to the IP address or bitmask is available; and
the server computer has been configured with a default bitmask, and a network with a size corresponding to the default bitmask is available in at least one public network block.

3. The server computer of claim 2, configured to manage network blocks of which part is managed by techniques other than the orchestration solution.

4. The server computer of claim 1, wherein the server computer, responsive to detecting that a previously assigned network is no longer being used, releases the previously assigned network.

5. The server computer of claim 4, wherein the server computer performs said detecting by tracking actual usage of the previously assigned network.

6. The server computer of claim 1, wherein the processing system further comprises program code instructions instructing the processing system to implement the following features:
dynamically assigning and releasing Internet Protocol ["IP"] resources to a plurality of hosts via the one or more orchestration solutions and the web-based application programming interface;
creating at least one unique IP resource for each of two or more hosts, wherein the two or more hosts are nodes of networks with overlapping address spaces, and
wherein the at least one unique IP resource is based on a combination of a name of a private network of a respective one of the two or more hosts, and an IP address within that private network.

7. A server computer comprising:
a processing system comprising at least one processing unit storing applications and data;
wherein the server computer commissions/decommissions networks to be activated/deactivated by one or more SDN controllers;
wherein the one or more SDN controllers and the server computer constitute a client-server architecture;
wherein the processing system comprises program code instructions instructing the processing system to implement the following features:
a user interface for remote management of the SDN controller, wherein the user interface provides access to data managed by the SDN controller;

a web-based client connector that communicates with an application programming interface of the SDN controller; and a network management logic that dynamically assigns and releases networks to be activated/deactivated by one or more SDN controllers, wherein the network management logic dynamically assigns and releases network blocks and individual network prefixes, networks, subnetworks and microsegments within each network block.

8. The server computer of claim 7, wherein the network management logic processes a request in which a network requested and assigns the requested network from a network block if at least one of the following conditions are true:

the request specifies a network block or prefix that has been tagged to the network user;

the server computer has configured a default bitmask, which is available in a network block tagged to the network user;

the request indicates an IP address or bitmask and the requested network and/or a public network of a size corresponding to the IP address or bitmask is available; and the server computer has been configured with a default bitmask, and a network with a size corresponding to the default bitmask is available in at least one public network block.

9. The server computer of claim 8, configured to manage network blocks of which part is managed by techniques other than the SDN controller.

10. The server computer of claim 7, wherein the server computer, responsive to detecting that a previously assigned network is no longer being used, releases the previously assigned network.

11. The server computer of claim 10, wherein the server computer performs said detecting by tracking actual usage of the previously assigned network.

12. The server computer of claim 7, wherein the processing system further comprises program code instructions instructing the processing system to implement the following features:

dynamically assigning and releasing Internet Protocol ["IP"] resources to a plurality of hosts via the one or more orchestration solutions and the web-based application programming interface;

creating at least one unique IP resource for each of two or more hosts, wherein the two or more hosts are nodes of networks with overlapping address spaces, and wherein the at least one unique IP resource is based on a combination of a name of a private network of a respective one of the two or more hosts, and an IP address within that private network.

13. A method comprising:

using a server computer having processing system comprising at least one processing unit storing program code instructions and data to commission/decommission networks and provisions the said networks to one or more orchestration solutions, wherein the one or more orchestration solutions and the server computer constitute a client-server architecture;

wherein execution program code instructions in the processing system instructing the processing system to implement the following features:

a user interface for the management of the server computer, wherein the user interface provides access to data managed by the server computer;

a web-based application programming interface that supports service oriented architecture ["SOA"]; and a network management logic that dynamically assigns and releases networks and provisions the said networks to one or more orchestration solutions and the web-based application programming interface, wherein the network management logic dynamically assigns and releases network blocks and individual network prefixes, networks, subnetworks and microsegments within each network block.

14. A method comprising:

using a server computer having processing system comprising at least one processing unit storing program code instructions and data to commission/decommission networks to be activated/deactivated by one or more SDN controllers, wherein the one or more SDN controllers and the server computer constitute a client-server architecture;

wherein execution program code instructions in the processing system instructing the processing system to implement the following features:

a user interface for remote management of the SDN controller, wherein the user interface provides access to data managed by the SDN controller;

a web-based client connector that communicates with an application programming interface of the SDN controller; and a network management logic that dynamically assigns and releases networks to be activated/deactivated by one or more SDN controllers, wherein the network management logic dynamically assigns and releases network blocks and individual network prefixes, networks, subnetworks and microsegments within each network block.

15. A computer-readable memory storing program code instructions for a server computer having a processing system comprising at least one processing unit to commission/decommission networks and provisions the said networks to one or more orchestration solutions, wherein the one or more orchestration solutions and the server computer constitute a client-server architecture; wherein execution of the program code instructions stored in the computer-readable memory instruct the processing system to implement:

a user interface for the management of the server computer, wherein the user interface provides access to data managed by the server computer;

a web-based application programming interface that supports service oriented architecture ["SOA"]; and a network management logic that dynamically assigns and releases networks and provisions the said networks to one or more orchestration solutions and the web-based application programming interface, wherein the network management logic dynamically assigns and releases network blocks and individual network prefixes, networks, subnetworks and microsegments within each network block.

16. A computer-readable memory storing program code instructions for a server computer having a processing system comprising at least one processing unit to commission/decommission networks to be activated/deactivated by one or more SDN controllers, wherein the one or more SDN controllers and the server computer constitute a client-server architecture; wherein execution program code instructions in the processing system instructing the processing system to implement:

a user interface for the management of the SDN controller, wherein the user interface provides access to data managed by the SDN controller;

a web-based client connector that communicates with an application programming interface of the SDN controller; and a network management logic that dynamically assigns and releases networks to be activated/deactivated by one or more SDN controllers, wherein the network management logic dynamically assigns and releases network blocks and individual network prefixes, networks, subnetworks and microsegments within each network block.

* * * * *